July 21, 1970 H. A. METCALFE 3,521,364
SIGHTING SQUARE
Filed Jan. 30, 1968 2 Sheets-Sheet 1
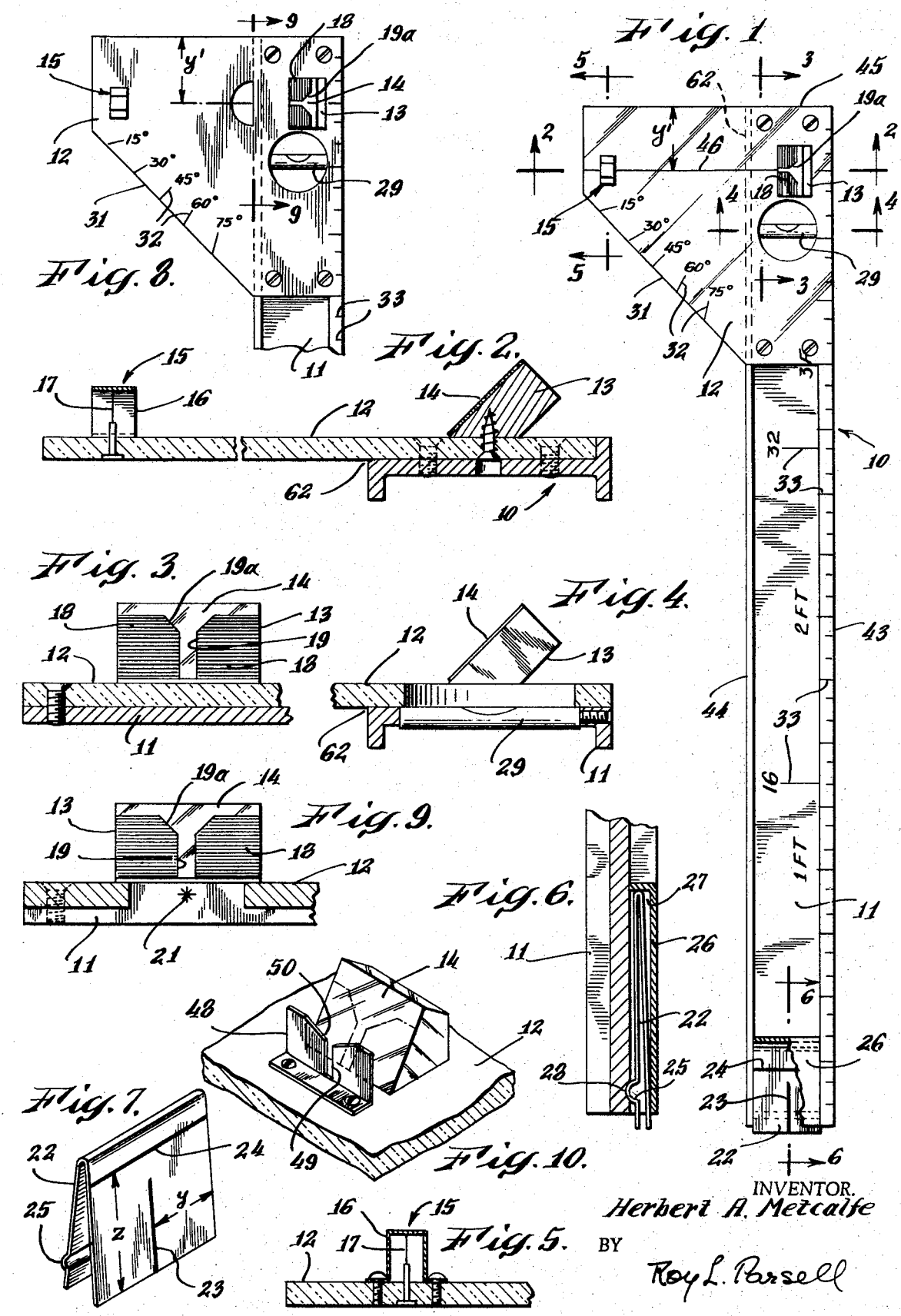
INVENTOR.
Herbert A. Metcalfe
BY
Roy L. Parsell
ATTORNEY.

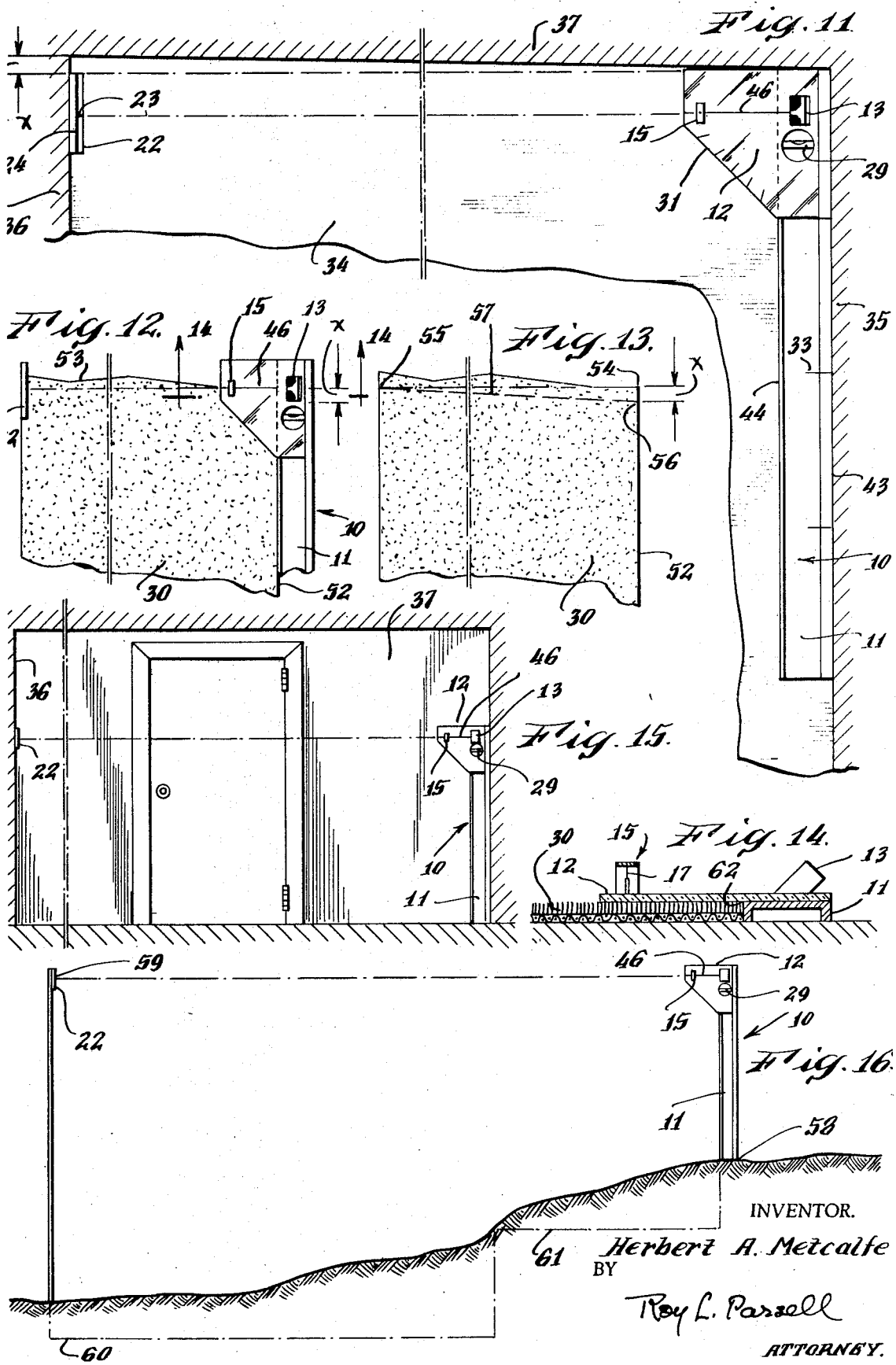

United States Patent Office 3,521,364
Patented July 21, 1970

3,521,364
SIGHTING SQUARE
Herbert A. Metcalfe, West Haven, Conn. (4411 N. Federal Highway, Bali-Hi Mobile Court, Pompano Beach, Fla. 33064)
Filed Jan. 30, 1968, Ser. No. 701,575
Int. Cl. G01c 5/00
U.S. Cl. 33—73
1 Claim

ABSTRACT OF THE DISCLOSURE

A sighting square for laying floor covering fashioned after the familiar carpenter's framing square having an elongated leg portion with two parallel edges, the outer one of which can be placed against or parallel to the edge of the floor to be covered and sights aligned with a target on the opposite side of the floor space to determine the correct angle of the floor space for cutting the floor covering. The inner edge of the sighting square can be placed against the edge of the floor covering to enable the floor covering to be accurately cut without unnecessary waste. The sighting means comprising a front sight and a rear sight mounted on the square to provide a sighting line and a mirror mounted on the square in this line of sight and at such an angle that the workman can line the sights up with a target by merely looking down at the mirror.

---

This invention relates to a hand tool or instrument for laying out and testing work using a combination of optical sighting square angles and plane edge surfaces.

Particular use of this instrument is found in the laying of surface coverings such as wall to wall carpeting, wall paneling and wainscoting. Another use is in establishing levels for building foundations and simple theodolite measuring.

This instrument is especially useful in the laying of wall to wall carpeting where it is necessary to determine the floor measurement and angles very accurately in order to minimize cutting wastes and trimming. Also to enable the carpet to be accurately and precisely cut from the roll at the warehouse to minimize handling and transportation costs.

It is therefore one of the objects of my invention to provide a means for easily and accurately making precise measurements.

Another object is to provide a light weight simple instrument easily manipulated and of precise accuracy.

Still another object is to provide an instrument which is foolproof to avoid mistakes.

Yet another object is to provide an inexpensive device which the artisan easily can afford to own.

Other objects and a fuller understanding of the invention may be had by referring to the following description and claim, taken in conjunction with the accompanying drawings in which:

FIG. 1 is a plan view of my sighting square;

FIG. 2 is a somewhat enlarged vertical sectional view taken on line 2—2 of FIG. 1;

FIG. 3 is a vertical sectional view somewhat enlarged of the rear sight member;

FIG. 4 is a vertical sectional view somewhat enlarged taken on line 4—4 of FIG. 1;

FIG. 5 is a vertical sectional view taken on line 5—5 of FIG. 1 and somewhat enlarged;

FIG. 6 is a vertical sectional view taken on line 6—6 of FIG. 1;

FIG. 7 is a perspective view of the target;

FIG. 8 shows another embodiment of my invention in which the head plate is opaque;

FIG. 9 is a vertical section somewhat enlarged taken on line 9—9 of FIG. 8;

FIG. 10 is a perspective view of a rear sight and reflecting surface;

FIG. 11 is a schematic plan view showing the method of using my invention to measure the square of a floor for a floor covering;

FIG. 12 is a schematic plan view showing the method of using my invention to square off a working edge of a carpet prior to laying out the measurements for cutting the carpet;

FIG. 13 shows a schematic plan view of the method of using my invention for measuring a carpet prior to cutting;

FIG. 14 is a vertical cross sectional view somewhat enlarged taken on line 14—14 of FIG. 12;

FIG. 15 is a schematic elevational view showing another use of my invention for laying out a horizontal line on a vertical surface; and FIG. 16 shows another use of my invention for determining elevation.

Referring now to the drawings, numeral 10 denotes the complete instrument comprising a main leg 11 having a first plane reference edge 43 and a second plane reference edge 44 opposite and parallel to the first edge 43 and a third plane reference end edge or 45 which is at an angle of 90° to both the first and second edges 43 and 44 respectively. The leg 11 is preferably made of an aluminum I beam to insure rigidity as well as lightness.

A head plate 12 is rigidly mounted on an end portion of leg 11 by any suitable means such as screws or bolts and is preferably made of transparent material such as plate glass or clear plastic, for example Lucite, for reasons which will appear later. I scribe a straight line 46 on the head plate 12 that is at an angle of 90° to the first and second reference edges 43 and 44 respectively and also spaced from the third reference edge 45. This line is a normal projection of an optical sighting axis 47 on the head plate 12 to be described later.

The head plate 12 may also be made of an opaque material such as pressed wood or plywood. In such a case I provide an opening 20 (FIG. 8) through the plate for purposes of aligning the instrument with a point 51 on a surface on which the instrument may be placed to be explained later on. To assist in placing my instrument on this point 51 (see FIGS. 8 and 9) I place an aserisk 21 or a vertical mark on the edge of the opening 20 where the projected sight line 46 intersects the second reference edge 44. This opening is not necessary when the plate 12 is of transparent material.

The head plate 12 is so positioned on the leg 11 that the third reference edge 45 of leg 11 continues along the edge of the plate forming an elongated reference edge 45 at 90° with first reference edge 43.

In the preferred form of my invention I mount head plate 12 on a surface between the first and second reference edges 43 and 44 respectively so as to form a shoulder or ledge 62 (see FIGS. 2 and 14) between the surface of the plate 12 which engages the companion face on the leg 11 between the second reference edge 44 and the first reference edge 43.

A front sight bead (FIGS. 1, 2 and 5) is mounted on head plate 12 on line 46 near the forward side of the plate 12. A guard 16 is mounted on the plate 12 over the front sight bead 15. A fine bead in the form of a wire 17 smaller in diameter than the diameter of the bead 15 is supported by the guard 16 so that the center line of both bead 15 and wire 17 are identical for purposes to be explained later.

A mirror 14 is mounted obliquely on the head plate 12 as shown in FIGS. 1 and 3 by means of a block 13 secured to the head by any suitable means as for example a screw. The face of the mirror is masked off by a rear sight comprising a shield in the shape of a familiar gun rear sight having a slot 49 leading out of a notch 50.

The slot 49 is cooperation with front sight bead 15 comprises aligning points for a sighting axis 47 when sighted to a target distant from front sight bead 15. This axis when normally projected on head 12 is represented by line 46 and is at 90° with first and second reference edges 43 and 44. It is now obvious that by viewing in the mirror 14 that the image of the target will appear aligned with the bead 15 in the slot 49 upon the proper positioning of the instrument. The wide notch 50 assists in locating the target 22 in line with the bead 15 and then adjusting the position of the instrument 10 so that the front sight wire 17 aligns with the slot 49 for precise sighting.

In the preferred embodiment of my invention (FIG. 10) I form my rear sight 48 from sheet material preferably metal, spacing it a short distance from the mirror 14 toward the front sight instead of mounting the rear sight as a mask directly on the mirror 14. This not only enables replacement of the mirror 14 without disturbing the adjustment of the rear sight 48 and vice versa but enables the mirror 14 to be so mounted that it can be tilted at the most convenient angle for the viewer.

I provide a target frame 22 (FIG. 7) which is A-shaped and of resilient material having on its front face a vertical line 23 and a horizontal line 24 on which a sight is taken from the mirror 14 aligned with bead 15 as will also be described later on.

It will be obvious that the distance $y$ on the target frame 22 (FIG. 7) must be equal to the distance $y^1$ on the head plate 12 (FIGS. 1 and 8) to insure accuracy accuracy when placing the square 10 and target 22 in positions for sighting.

Being made of resilient material such as sheet metal or plastic the target frame 22 may be collapsed as shown in FIG. 6 and carried when not in use in a pocket 27 formed by plate 26 mounted on leg 11 (see FIGS. 1 and 6). A detent means comprising companion ridge 25 and groove 28 on a leg of the target frame 22 and the main leg 11 respectively retains the target 22 in the pocket 27.

A spirit level 29 (FIGS. 1 and 4) is mounted on main leg 11 adjacent mirror 14 to indicate when the main leg is in a vertical position for use as will be subsequently described.

To insure accuracy in holding the square 10 in a vertical position I may mount a second spirit level tube (not shown) at right angles to spirit level tube 29 to indicate when the square 10 is vertical in a vertical plane at right angles to the plane of the head plate.

In using my sighting square instrument 10 to measure a floor 34 for wall to wall carpeting for example, the operator will place the sighting square 10 in one corner of the room (FIG. 11) with the main leg 11 laid against a first side wall 35 and the head plate 12 against the adjacent first end wall 37 and then places the target frame 22 in the opposite corner of first end wall 37 or he may have a helper stationed in this corner to adjust the target if necessary.

Since the vertical line 23 on the target is located the same distance from the edge of the target as the bead 15 is from the reference edge 45 of head plate 12, the target image line 23 will appear in the mirror in line with bead 15 or wire 17 provided the corner where the sighting square 10 is placed is 90°.

If, on the other hand, the corner is more than 90° as shown in FIG. 11 the target 22 must be moved away from first end wall 37 until the vertical line 23 of the target lines up as in the case of the 90° corner just described. Hence the distance which the target has to be moved is the additional distance that the carpet must be allowed for when cutting off the roll at the warehouse to allow for fitting on the floor 34 of the room in question.

Conversely it will be obvious that if the corner just mentioned is less than 90°, it is the instrument 10 that must be moved to line up the sights and the target. The distance which the instrument 10 is from first end wall 37 represents the amount to be trimmed when the carpet is laid.

If necessary a similar respective method may be followed at the opposite end of the room so that the minimum amount of carpeting will be unrolled.

In another embodiment (FIG. 15) of my method I use the square 10 in a vertical position against first end wall 37 by means of spirit level 29 at a desired elevation on first end wall 37 for location of a wainscoting or the like. This is especially advantageous when openings such as windows or doors are located in the vertical wall. The target is held against the opposite or second wall 36 by any suitable means and in this operation the horizontal line 24 on target 22 is used in lining up the sights.

I find it useful to place graduations on the 45° edge 31 of head plate 12 for determining different angles by holding a straight edge or ruler on the desired angle graduation 32 and as a center the point where line 46 intersects the second reference edge 44 or the location of asterisk or mark 21 (FIG. 9) as the case may be.

As another convenient feature I place graduation 42 along the edge 41 of leg 11 (FIG. 1) such as a yard stick or spaced marking to indicate stud centers at the standard of 16 inch intervals.

In order that my square 10 be foolproof for the ordinary artisan I fix the head plate 12 to the leg 11 rigidly and permanently because if it was swiveled or adjustable to a desired angle there would always be the risk that the setting was not properly or accurately set at zero.

However for the more experienced craftsman, the head plate 12 may be swiveled (not shown) on an axis located perpendicular to head plate 12 at the point where projected sight line 46 intersects second reference edge 44. I would in this latter embodiment provide adjustable clamping means (not shown) to retain the plate 12 and leg 11 in fixed relationship.

Various methods of using my invention will now be described.

Having determined the necessary allowance, if any, to be added to the carpet for fitting, the carpet is unrolled and the edge trimmed or "squared off" to make a working edge which is a straight edge and square with selvage edge 52 of the carpet 30. This is done by placing the sighting square instrument 10 along one side of the carpet 30 (see FIGS. 12 and 14) and the target 22 with the line 46 intersecting the selvage edge 52 at the proper distance to clear any imperfections 53 in the edge of the carpet roll as previously cut. I then make a suitable first mark 54 on the carpet 30 as for example inserting a safety pin and using the sighting square 10 and target 22 I locate a second point 55 on the opposite edge of the carpet and mark it with suitable means similar to that just described, remove square 10 and snap a chalk line between the two points 54 and 55 or use a straight edge and proceed to trim the carpet edge.

Then proceeding as shown in FIG. 13 I measure back from the squared or working edge just trimmed, the distance "X" that the room floor is out of square and mark the selvage edge 52 at this third point 56. Then I snap a chalk line between third point 56 and second point 55 to indicate the working edge 57 and I am ready to cut the carpet to fit the first end 37 of the room.

In a like manner the other end of the carpet can be cut after measuring the floor for length and squaring.

One very important use of my invention is found where it is necessary to attach a binding to the carpet edges. It is obvious that accurate measurements and angles must be first obtained of the floor surface and then just as precisely applied to the carpet at the warehouse or shop.

In another embodiment of the use of my instrument as shown in FIG. 16, I locate certain desired level points on an irregular terrain. The problem taken for example is to determine certain locations and levels to make excavations as for building concrete for floors or foundations. The instrument 10 is held in a vertical position on a first reference point 58 and level sight is made to target 22 on a second reference point 59. From the elevation at second reference point 59 a vertical measurement can be dropped to the desired level 60 in the terrain. In a similar manner the level at terrain point 61 may be determined.

Although I have described my invention with a certain degree of particularity, it is understood that the present disclosure has been made only by way of example and that numerous changes in the details of construction and combination and arrangement of parts may be resorted to without departing from the spirit and scope of the invention as hereinafter claimed.

What is claimed is:

1. A sighting square for measuring the laying of a floor covering comprising an elongated leg portion having a rectangular cross section and an arm portion disposed at one end of said leg portion and extending laterally adjacent one side thereof; said leg portion having the two longitudinal parallel vertical sides formed with plane surfaces to constitute a first reference surface and a second reference surface; said reference surfaces having parallel bottom edges; the underside of said arm portion spaced above a plane passing through said bottom edges; a first sight member mounted on the top face of said arm portion and spaced from said first reference surface; a rear sight member so mounted on the top face of the sighting square as to form a sighting line through said sight members which is 90° with the extended plane of said first reference surface; a reflecting means mounted on said sighting square and disposed at such an angle with a plane passing through said bottom edges that an observer positioned above and remote from said sighting square may observe the respective images of said sight members; a target means disposed remotely from the sighting square when said sighting line is aligned with the target means; said front sight member comprising a first bead and a second bead axially superimposed on said first bead to present a narrow face to said rear sight member and said rear sight member provided with an upstanding plate member having a verticaly disposed slot with a lower portion thereof having parallel edges and the upper edge portions of said slot flaring outwardly.

References Cited

UNITED STATES PATENTS

| 1,221,777 | 4/1917 | Uney | 33—89 |
| 2,761,215 | 9/1956 | Macklanburg | 33—89 |
| 558,402 | 4/1896 | Lyman | 33—52 X |
| 948,777 | 2/1910 | Tuomi. | |
| 1,012,740 | 12/1911 | Stamps. | |
| 1,264,146 | 4/1918 | Beydler | 33—63 |
| 1,709,310 | 4/1929 | Dahl. | |
| 2,407,960 | 9/1946 | Mariotti | 33—73 X |
| 3,167,864 | 2/1965 | Lange. | |

FOREIGN PATENTS

| 805,445 | 5/1951 | Germany. |

HARRY N. HAROIAN, Primary Examiner

U.S. Cl. X.R.

33—74, 89